United States Patent
Choi et al.

(10) Patent No.: US 8,761,780 B2
(45) Date of Patent: Jun. 24, 2014

(54) ACCESS POINT, MOBILE STATION FOR WIRELESS COMMUNICATION SYSTEM, AND METHOD FOR CONTROLLING THE SAME

(75) Inventors: Hyun Ho Choi, Daejeon (KR); Tae In Hyon, Hwaseong-si (KR); Hyo Sun Hwang, Seoul (KR); In Sun Lee, Seoul (KR); Young Soo Kim, Seoul (KR); Hyun Gi Ahn, Incheon (KR)

(73) Assignees: Samsung Electronics Co., Ltd., Suwon-si (KR); Samsung Electro-Mechanics Co., Ltd., Suwon-si (KR)

( * ) Notice: Subject to any disclaimer, the term of this patent is extended or adjusted under 35 U.S.C. 154(b) by 822 days.

(21) Appl. No.: 11/959,532

(22) Filed: Dec. 19, 2007

(65) Prior Publication Data
US 2009/0061783 A1    Mar. 5, 2009

(30) Foreign Application Priority Data
Aug. 28, 2007    (KR) .................. 10-2007-0086738

(51) Int. Cl.
*H04W 40/00*    (2009.01)
(52) U.S. Cl.
USPC .................. 455/447; 455/422.1; 455/450
(58) Field of Classification Search
None
See application file for complete search history.

(56) References Cited

U.S. PATENT DOCUMENTS

| | | | |
|---|---|---|---|
| 2005/0047386 A1* | 3/2005 | Yi | 370/345 |
| 2005/0058151 A1* | 3/2005 | Yeh | 370/445 |
| 2005/0090275 A1* | 4/2005 | Wang | 455/512 |
| 2005/0113026 A1* | 5/2005 | Moorti et al. | 455/63.1 |
| 2006/0121854 A1* | 6/2006 | Abhishek et al. | 455/63.1 |
| 2008/0233946 A1* | 9/2008 | Henry | 455/422.1 |

FOREIGN PATENT DOCUMENTS

KR    10-2006-0063704 A    6/2006

OTHER PUBLICATIONS

Korean Office Action issued Oct. 18, 2013 in counterpart Korean Patent Application No. 10-2007-0086738. (4 pages in Korean).

* cited by examiner

*Primary Examiner* — Suhail Khan
(74) *Attorney, Agent, or Firm* — NSIP Law

(57) ABSTRACT

An access point (AP) and a mobile station in a wireless communication system and a method of controlling the same are provided. A method of controlling an AP in a wireless communication system includes: determining whether a transmission of a control message is needed; transmitting the control message via a first frequency band when the transmission of the control message is needed; determining whether a transmission of a data message is needed; and transmitting the data message via a second frequency band when the transmission of the data message is needed.

20 Claims, 5 Drawing Sheets

ACCESS POINT, MOBILE STATION FOR WIRELESS COMMUNICATION SYSTEM, AND METHOD FOR CONTROLLING THE SAME

CROSS-REFERENCE TO RELATED APPLICATION

This application claims the benefit of Korean Patent Application No. 2007-86738, filed on Aug. 28, 2007 in the Korean Intellectual Property Office, the disclosure of which is incorporated herein by reference

BACKGROUND OF THE INVENTION

1. Field of the Invention

Aspects of the present invention relate to a wireless communication system, and more particularly, to an access point (AP) and a mobile station in a wireless communication system and a method of controlling the same.

2. Description of the Related Art

A current wireless communication system provides a nomadic service using, for example, an industrial, scientific, and medical (ISM) band. The ISM band is a frequency band that is used for communication in a limited location by generating radio energy for industrial use, scientific use, medical use, home use, and other similar uses.

However, in the case of the ISM band, a path loss phenomenon is relatively serious and straightness is also relatively strong. Therefore, signals may not be transmitted at a desired level to a distant mobile station, a mobile station that is located in an area blocked by walls, and the like. In particular, an error frequently occurs during a process of transmitting a control message, such as a beacon message, a request to send (RTS) message, a clear to send (CTS) message, and the like.

To solve the above problems, the control message may be transmitted using the lowest level of a modulation and coding set (MCS). However, a channel occupancy time may significantly increase and thus a message transmission efficiency may be relatively deteriorated. The lowest level of the MCS is also referred to as the most robust MCS.

Also, to solve the above problems, supporting multi-channels for the ISM band in the wireless communication system may be considered. However, since a duplicate control message must be transmitted for each channel, the transmission efficiency of all channels may be reduced.

SUMMARY OF THE INVENTION

Aspects of the present invention provide a method and system that can improve a coverage and minimize a covered region of a wireless communication system.

Aspects of the present invention also provide a method and system that can improve the reliability of transmission of a control message in a wireless communication system.

Aspects of the present invention also provide a method and system that can improve a Media Access Control (MAC) transmission efficiency in a wireless communication system.

According to an aspect of the present invention, there is provided a method of controlling an access point (AP) in a wireless communication system, the method including: determining whether a transmission of a control message is needed; transmitting the control message via a first frequency band when the transmission of the control message is needed; determining whether a transmission of a data message is needed; and transmitting the data message via a second frequency band when the transmission of the data message is needed.

According to another aspect of the present invention, there is provided a method of controlling a mobile station in a wireless communication system, the method including: determining whether a transmission of a control message is needed; transmitting the control message via a VHF or UHF TV band when the transmission of the control message is needed; determining whether a transmission of a data message is needed; transmitting the data message via an industrial, scientific, and medical (ISM) band when the transmission of the data message is needed; determining whether an incumbent user for the VHF or UHF TV band appears; switching to the ISM band when the incumbent user appears; receiving information about an additional VHF or UHF TV band from the AP via the ISM band; and transmitting a response signal to the AP via the additional VHF or UHF TV band.

According to still another aspect of the present invention, there is provided a method of transmitting a signal of an AP in a wireless communication system capable of using at least two frequency bands, the method including: transmitting a control message via a first frequency band; and transmitting a data message via a second frequency band after transmitting the control message, wherein the first frequency band is a lower frequency band than the second frequency band.

According to yet another aspect of the present invention, there is provided an AP of a wireless communication system, including: a first determination unit to determine whether a transmission of a control message is needed; a first transmitter to transmit the control message via a first frequency band when the transmission of the control message is needed; a second determination unit to determine whether a transmission of a data message is needed; and a second transmitter to transmit the data message via a second frequency band when the transmission of the data message is needed.

According to a further aspect of the present invention, there is provided a mobile station of a wireless communication system, including a first determination unit to determine whether a transmission of a control message is needed; a first transmitter to transmit the control message via either a VHF or UHF TV band when the transmission of the control message is needed; a second determination unit to determine whether a transmission of a data message is needed; a second transmitter to transmit the data message via an ISM band when the transmission of the data message is needed; a third determination unit to determine whether an incumbent user for the VHF or UHF TV band appears; a switching unit to switch to the ISM band when the incumbent user appears; a receiver to receive information about an additional VHF or UHF TV band from the AP via the ISM band; and a third transmitter to transmit a response signal to the AP via the additional VHF or UHF TV band.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
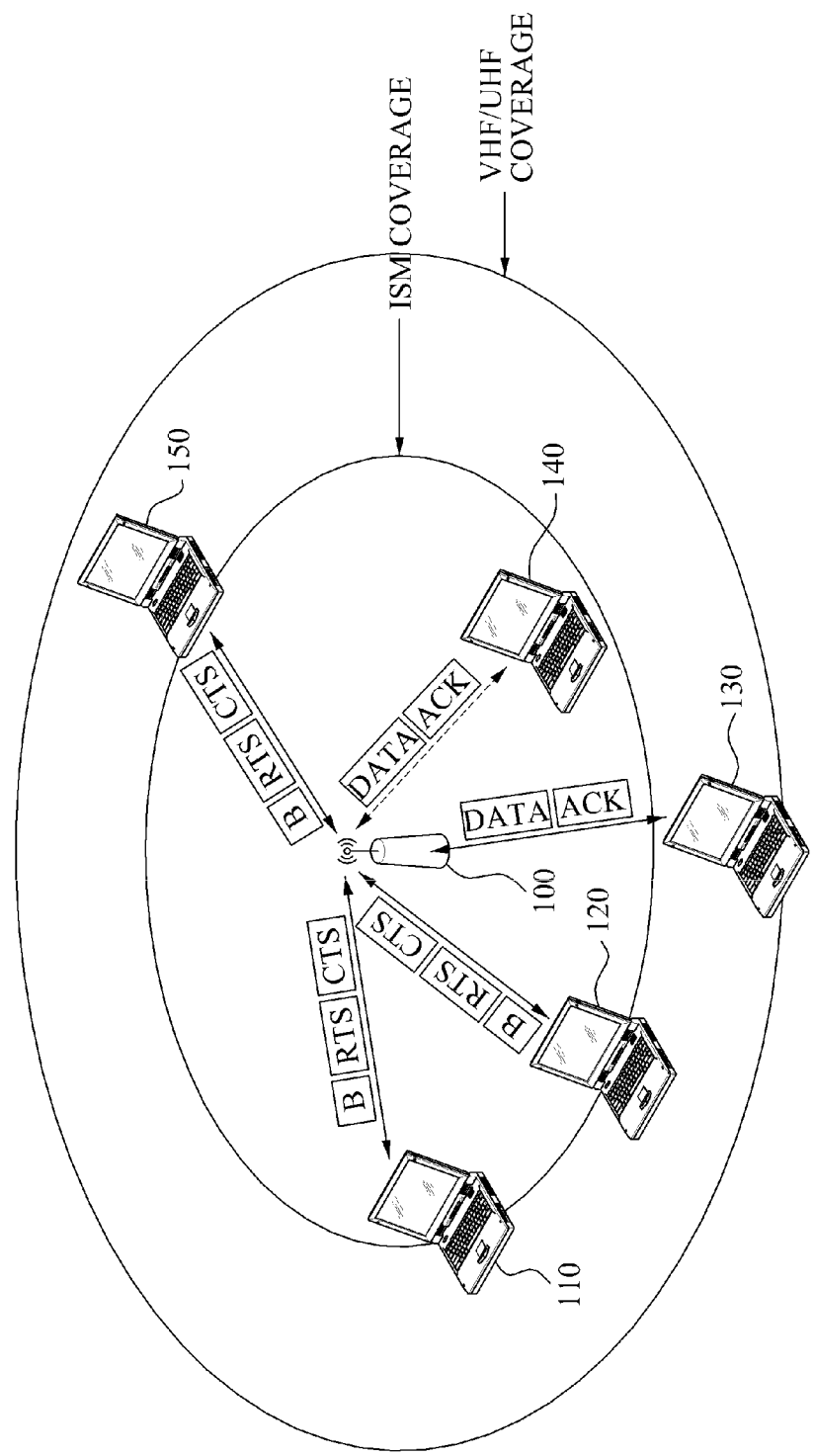
FIG. 1 shows a wireless communication system according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 shows a wireless communication system according to an embodiment of the present invention. Hereinafter, the wireless communication system according to an aspect of the present invention will be described with reference to FIG. 1.

As shown in FIG. 1, mobile stations 110, 120, 130, 140, and 150 are located within a predetermined distance from an access point (AP) 100 in the wireless communication system. The wireless communication system may be represented in a form of a cell and at least one of the mobile stations 110, 120, 130, 140, and 150 may be included in the cell.

In the conventional art, in the case of a control message and a data message, communications are enabled in the wireless communication system using only one frequency band, for example, an industrial, scientific, and medical (ISM) band as a representative example. The control message includes, for example, a beacon message, a request to send (RTS) message, a clear to send (CTS) message, and the like, and the data message includes, for example, data, an acknowledgement (ACK) message, and the like.

However, as shown in FIG. 1, according to an aspect of the present invention, it is possible to further use an additional frequency band that has relatively excellent channel features in various aspects in comparison to the ISM band. For example, an unused frequency band may exist depending on a region or time. A representative example of the unused frequency band includes a very high frequency (VHF)/ultra high frequency (UHF) television (TV) band. The unused frequency band is also referred to as a white space. According to the results of studies of the present invention, a number of unused VHF/UHF TV bands may further increase while a current analog TV system is changing to a digital TV system.

In an aspect of the present invention, the wireless communication system uses the ISM band and the VHF/UHF band TV band as a dual band, but it is only an example and the present invention is not limited thereto. Therefore, even when another dual band scheme is used in the wireless communication system, it still falls within the scope of the present invention which will be apparent in the claims.

As shown in FIG. 1, the AP 100 transmits to the mobile stations 110, 120, and 150 a control message such as a beacon message, an RTS message, a CTS message, and the like, via the VHF/UHF TV band. The AP 100 transmits to the mobile station 140 a data message such as data, an ACK message, and the like, via the ISM band. Further, a relatively higher modulation and coding set (MCS) may be allocated depending on a channel state by applying adaptive modulation and coding (AMC) to the control message that is transmitted via the VHF/UHF TV band. In FIG. 1, a solid line denotes transmitting/receiving of signals via the VHF/UHF TV band, and a dotted line denotes transmitting/receiving of signals via the ISM band.

In the case of the mobile station 130 that is located outside a coverage where signals of the ISM band affect, the mobile station 130 may transmit and receive signals via the VHF/UHF TV band. Therefore, the mobile station 130 may transmit a data message using a contention scheme of a general wireless communication system during a period of time when there is no transmission of the control message via the VHF/UHF TV band.

Also, since the frequency of the VHF/UHF TV band is lower than the frequency of the ISM band, a path loss is not serious and ability to pass through objects is also excellent and thus the VHF/UHF TV band shows relatively excellent channel features. More specifically, each of the VHF/UHF TV band and the ISM band may be classified into 2.4 GHz (5 GHz) and 54-862 MHz in an aspect of available frequency band, "great" and "small" in an aspect of path loss, "narrow" and "wide" in an aspect of coverage, "robust straightness" and "robust ability to pass through objects" in an aspect of radio characteristics, "limited maximum transmission power" and "adjustable" in an aspect of power, "great" and "small" in an aspect of radio frequency (RF) cost, 20 MHz and 6 MHz (bonding is possible) in an aspect of bandwidth, and the like. From this, it can be verified that the VHF/UHF TV band has more excellent channel features than the ISM band.

Figure 2:
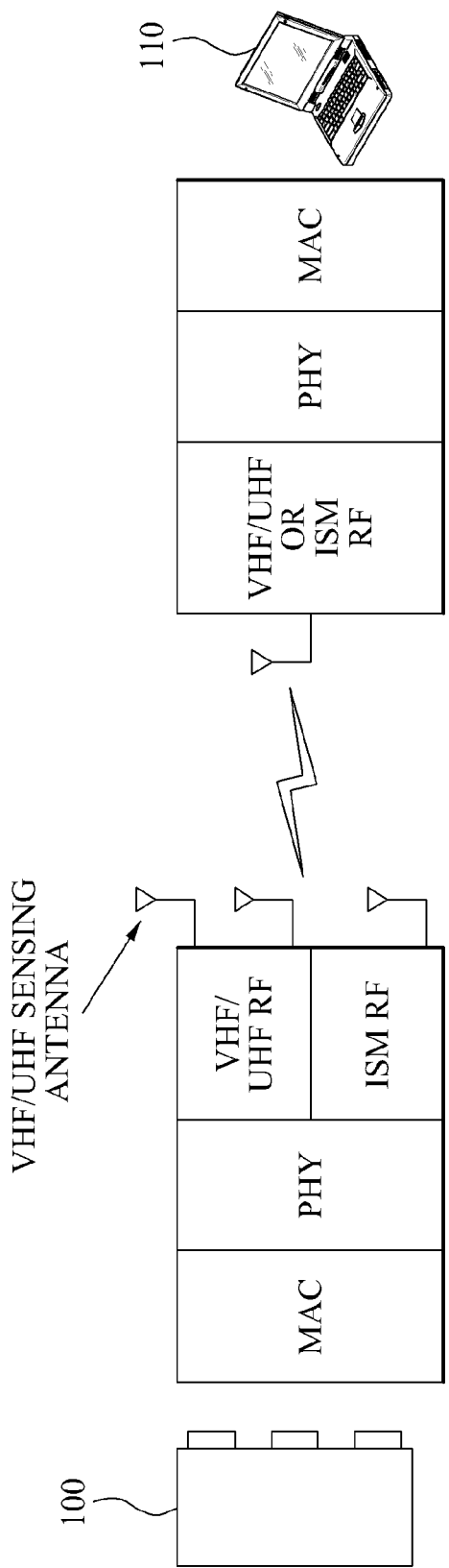
FIG. 2 shows an internal structure of an access point (AP) and a mobile station in a wireless communication system according to an embodiment of the present invention.

FIG. 2 shows an internal structure of an AP 100 and a mobile station 110 in a wireless communication system according to an embodiment of the present invention. Hereinafter, the internal structure of the AP 100 and the mobile station 110 in the wireless communication system according to an aspect of the present invention will be described with reference to FIG. 2.

Referring to FIG. 2, the AP 100 includes an RF module, a physical layer (PHY) module, and a Media Access Control (MAC) module. The RF module includes two sections. One section VHF/UHF RF is to process the VHF/UHF TV band and the other section ISM RF is to process the ISM band. The RF module may simultaneously proceed with processes associated with RF of the two bands, PHY, and MAC. The mobile station 110 may be designed in the same structure as the AP 100, but the mobile station 110 also may be designed to include one RF chain as shown in FIG. 2. Also, the AP 100 may include a VHF/UHF TV band sensing unit separate from the RF module.

The PHY module integrally processes data that are received via the VHF/UHF TV band and the ISM band. The MAC module integrally processes data that are received via a multi-channel. The RF module, the PHY module, and the MAC module may readily switch between the VHF/UHF TV band and the ISM band.

Figure 3:
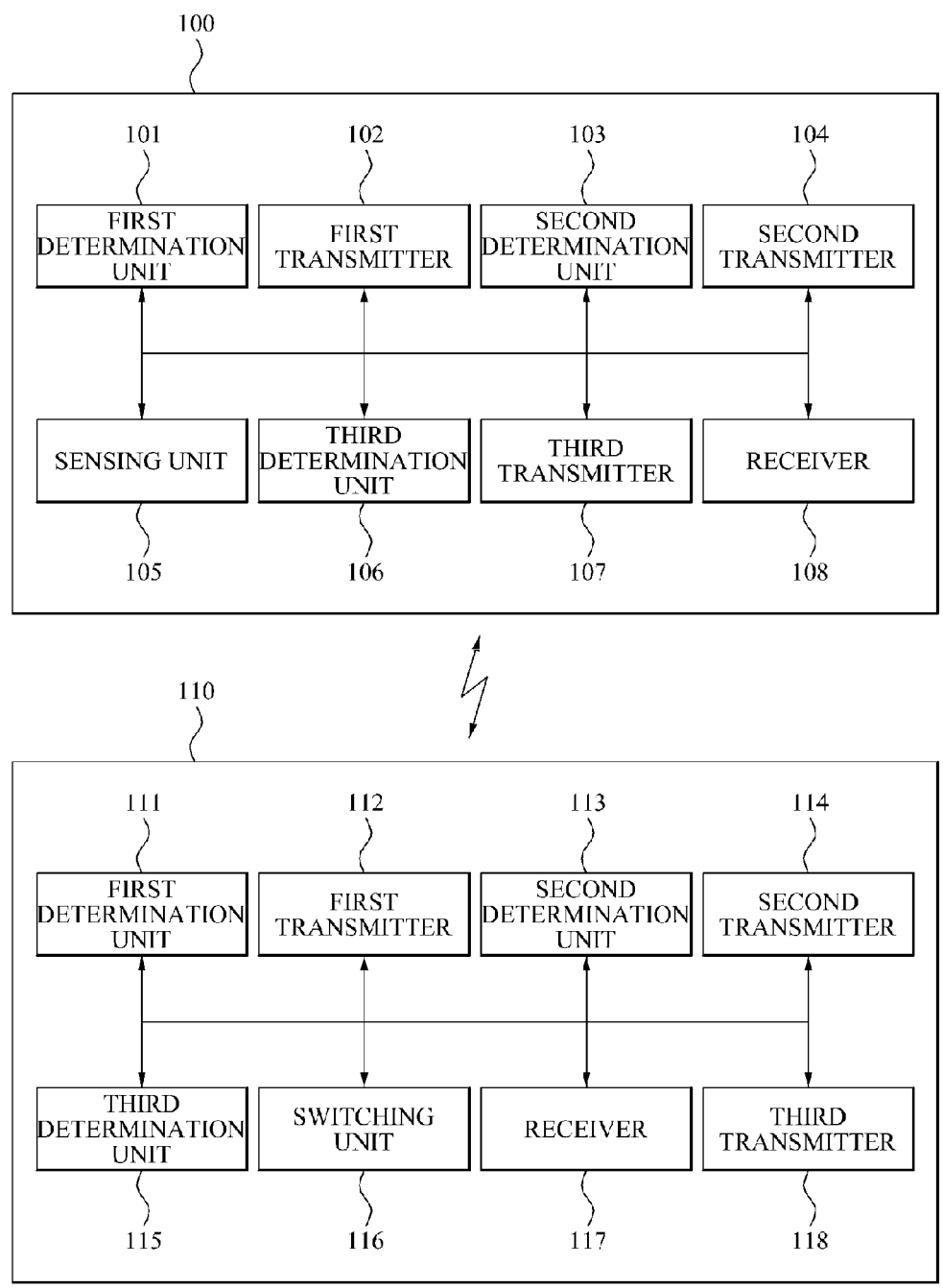
FIG. 3 is a block diagram showing an internal structure of an AP and a mobile station in a wireless communication system according to an embodiment of the present invention.

FIG. 3 is a block diagram showing an internal structure of an AP 100 and a mobile station 110 in a wireless communication system according to an embodiment of the present invention. Hereinafter, the internal structure of the AP 100 and the mobile station 110 in the wireless communication system according to an aspect of the present invention will be described with reference to FIG. 3.

FIG. 3 generally shows a module that is directly and/or indirectly associated with an aspect of the present invention. Blocks of FIG. 3 may be designed into modules and each of the modules denotes one unit to process a particular function or an operation. The module may be embodied into hardware or software, or a combination of hardware and software.

Referring to FIG. 3, the wireless communication system according to an aspect of the present invention includes the AP 100 and the mobile station 110. The AP 100 includes a first determination unit 101, a first transmitter 102, a second determination unit 103, a second transmitter 104, a sensing unit 105, a third determination unit 106, a third transmitter 107, and a receiver 108. The mobile station 110 includes a first determination unit 111, a first transmitter 112, a second determination unit 113, a second transmitter 114, a third determination unit 115, a switching unit 116, a receiver 117, and a third transmitter 118.

The first determination unit 101 of the AP 100 determines whether a transmission of a control message is needed. For example, the control message includes a beacon message, an RTS message, a CTS message, and the like. When the transmission of the control message is needed as a result of the determination, the first transmitter 102 transmits the control message via a first frequency band, for example, a VHF/UHF TV band, and the like. The second determination unit 103 determines whether a transmission of a data message is needed. The data message includes data, an ACK message, and the like. When the transmission of the data message is needed as a result of the determination, the second transmitter 104 transmits the data message via a second frequency band, for example, an ISM band and the like. As described above, according to an aspect of the present invention, the control message in which reliability is considered as highly important is transmitted using a separate frequency band. Therefore, it is possible to solve problems such as a narrow coverage and a covered region in the existing wireless communication system, and it is also possible to improve the reliability of transmission of the control message.

Further, according to another aspect of the AP 100, the sensing unit 105 performs a spectrum sensing operation for extracting an additional first frequency band. The reason for the above operation is that the use of the existing VHF/UHF TV band must be stopped and the additional first frequency band must be used for the appearance of the incumbent user when using a shared channel such as the VHF/UHF TV band for the first frequency band.

The third determination unit 106 determines whether the incumbent user for the first frequency band appears. When the incumbent user appears, the third transmitter 107 transmits information about the extracted additional first frequency band to the mobile station 110 via the second frequency band. The receiver 108 receives a response signal from the mobile station 110 via the extracted additional first frequency band. Therefore, according to an aspect of the present invention, it is possible to stably use a dual-band scheme regardless of appearance of the incumbent user.

The first determination unit 111 of the mobile station 110 determines whether a transmission of a control message is needed. When the transmission of the control message is needed as a result of the determination, the first transmitter 112 transmits the control message via the VHF/UHF TV band. The second determination unit 113 determines whether a transmission of a data message is needed. When the transmission of the data message is needed as a result of the determination, the second transmitter 114 transmits the data message via an ISM band. The third determination unit 115 determines whether an incumbent user for the VHF/UHF band appears. When the incumbent user appears, the switching unit 116 switches to the ISM band. The receiver 117 receives information about an additional VHF/UHF band from the AP 100 via the ISM band. The third transmitter 118 transmits a response signal to the AP 100 via the additional VHF/UHF TV band.

In particular, the third determination unit 115 may adopt at least one of a scheme of determining whether the incumbent user appears when a wireless communication fails during a predetermined threshold time, and a scheme of sensing the incumbent user by using a periodical signal and thereby determining whether the incumbent user appears.

Figure 4:
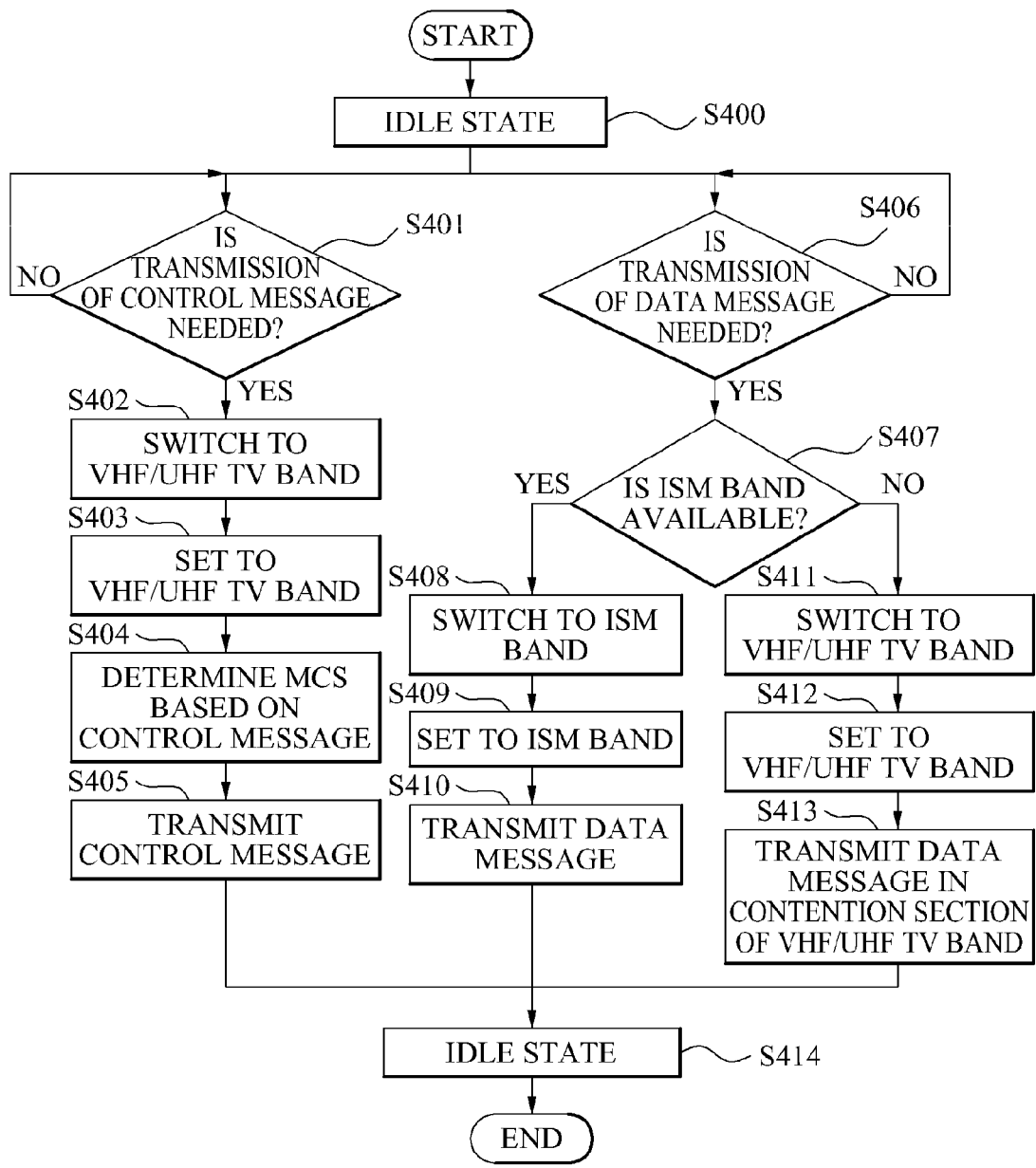
FIG. 4 is a flowchart showing a method of controlling an AP and a mobile station in a wireless communication system according to an embodiment of the present invention.

FIG. 4 is a flowchart showing a method of controlling an AP and a mobile station in a wireless communication system according to an embodiment of the present invention. Hereinafter, the method of controlling an AP and a mobile station in a wireless communication system will be described with reference to FIG. 4. In an aspect of the present invention, the AP or the mobile station may become the entity of FIG. 4. However, depending on a design, the AP may simultaneously process a VHF/UHF TV band and an ISM band whereas the mobile station may process only one band at a time. Therefore, in the above structure, the mobile station may maintain only one band state at a time whereas the AP may simultaneously maintain both the VHF/UHF TV band state and the ISM band state. The mobile station may be designed like the AP.

When the AP is in an idle state in operation S400, it is determined whether a transmission of a control message is needed in operation S401. Hereinafter, the AP will be described as the entity, but it will be apparent to those of ordinary skill in the art that the same descriptions will be applicable to the mobile station.

When the transmission of the control message is needed, a channel is switched to a VHF/UHF TV band in operation S402. In operation S403, a band state is set band state to the VHF/UHF TV band. In operation S404, an MCS for transmission of the control message is determined.

The MCS is a combination of channel coding and predetermined modulation. For example, the MCS includes a quadrature amplitude modulation (QAM) 256, a QAM 64, quadrature phase shift keying (QPSK), binary phase shift keying (BPSK), and the like. The channel occupancy resource includes a channel occupancy time, a channel occupancy frequency, and the like. The constant values may vary depending on a test result, the intent of a designer, and the like.

The control message is transmitted based on the determined MCS in operation S405.

When the AP is in the idle state in operation S400, it is determined whether a transmission of a data message is needed in operation S406. When it is needed, it is determined whether an ISM band is available in operation S407. In operation S406, a current AP determines whether the current AP may transmit and receive a signal via the ISM band.

When the ISM band is available as a result of the determination in operation S407, a band is switched to the ISM band in operation S408. In operation S409, a band state is set bend state to the ISM band. In operation 3410, the data message is transmitted.

Conversely, when the ISM band is unavailable since a signal via the ISM band is weak as a result of the determination in operation S407, the band is switched to the VHF/UHF TV band in operation S411. In operation S412, the band state is set bend state to the VHF/UHF TV band. In operation S413, the data message is transmitted through a basic wireless communication contention process in a section where the control message is not transmitted.

After operations S405, S410, and S413 are all completed, the AP is again in the idle state in operation S414.

Figure 5:
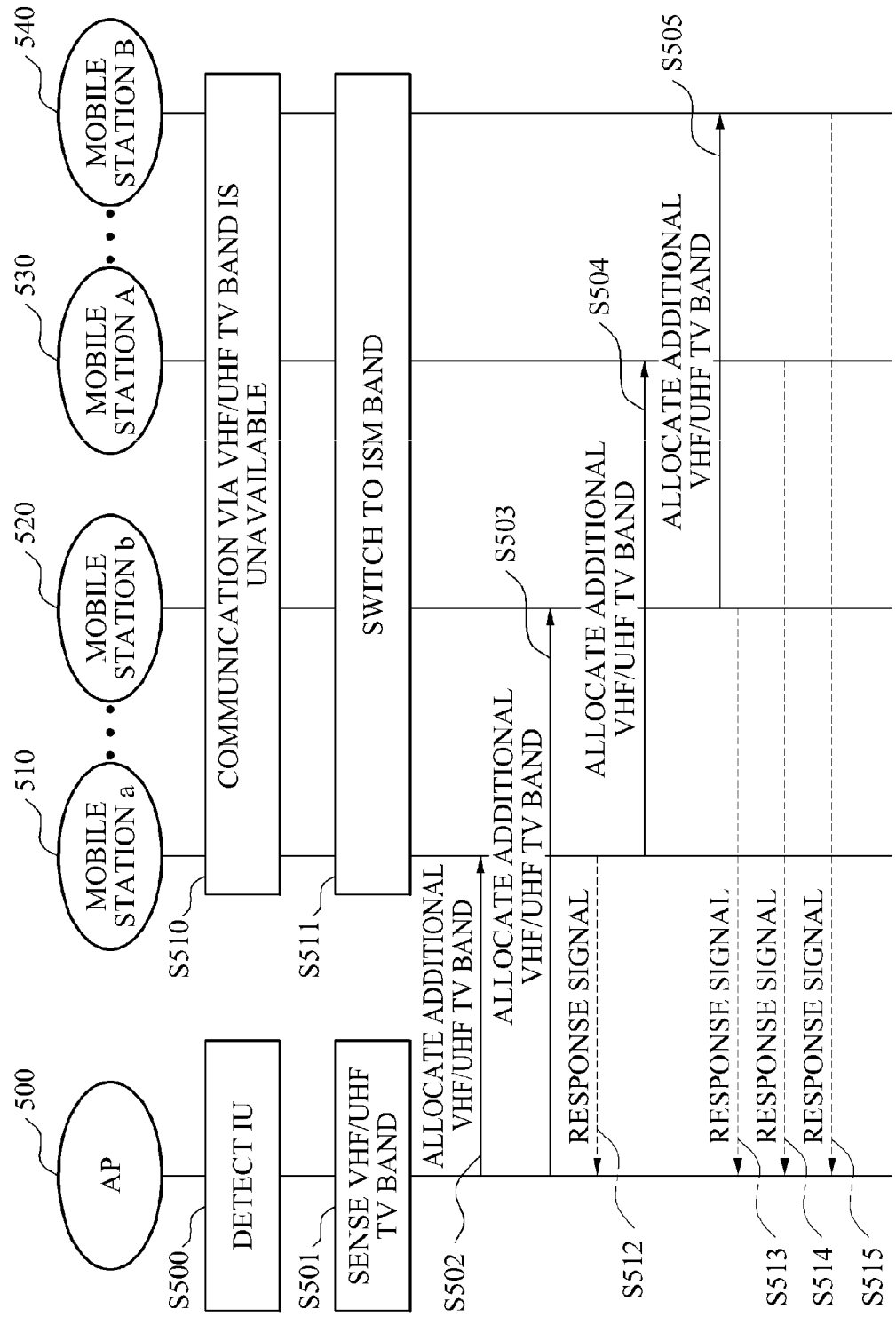
FIG. 5 is a flowchart showing a method of controlling an AP and a mobile station in a wireless communication system according to another embodiment of the present invention.

FIG. 5 is a flowchart illustrating a method of controlling an AP and a mobile station in a wireless communication system according to another embodiment of the present invention. Hereinafter, the method of controlling the AP and the mobile station in the wireless communication system will be described with reference to FIG. 5. FIG. 5 shows a method of switching to an additional VHF/UHF TV band, even when an incumbent user appears, and thereby stably operating the wireless communication system. FIG. 5 is based on FIG. 4 and thus repeated descriptions, which will be still understood by those of ordinary skills in the art will be omitted here.

In operation S500, an AP 500 may detect an incumbent user (IU) for a VHF/UHF TV band by sensing the VHF/UHF TV band. In this case, the AP 500 must broadcast to a mobile station side within a cell, information about an additional VHF/UHF TV band that can be additionally used using an ISM band. For the above operation, the AP 500 may continuously sense the VHF/UHF TV band in operation S501. Therefore, the AP 500 may manage information about other available VHF/UHF TV bands.

When a control message is not transmitted via the VHF/UHF TV band during a predetermined threshold time in operation S510, a mobile station a 510, a mobile station b 520, a mobile station A 530, a mobile station B 540, and the like, switch to an original ISM band that is currently being used by the AP 500. The predetermined threshold time may be the allowable maximum time, for example, a beacon period, and the like, although the control message is not transmitted.

In FIG. 5, it is assumed that operation S511 is performed after operation S510 is completed. In another aspect of the present invention, the mobile station side may directly sense the incumbent user and thereby perform operation S510 when the incumbent user is sensed. When performing operation S510, fast channel switching is enabled. On the other hand, when using only the method of directly sensing the incumbent user, or when combining the method and operation S510, it is possible to reduce an error rate.

The AP 500 that completed operations S500 and 501 transmits information about an additional VHF/UHF TV band to the mobile station a 510 and the mobile station b 520 in operations S502 and S503, respectively. The mobile station a 510 and the mobile station b 520 continuously transmit information about the additional VHF/UHF TV band to the mobile station A 530 and the mobile station B 540 in operations S504 and S505, respectively. The mobile station a 510 and the mobile station b 520 are located in the coverage of the ISM band shown in FIG. 1. The mobile station A 530 and the mobile station B 540 are outside the coverage of the ISM band and located only within the coverage of the VHF/UHF TV band shown in FIG. 1. In a cell structure of the wireless communication system according to an aspect of the present invention, mobile stations may be located only within the coverage of the VHF/UHF TV band. Therefore, the flooding operation is needed.

The mobile stations 510, 520, 530, and 540 that receive information about the additional VHF/UHF TV band transmit a response signal to the AP 500 in operations S512, S513, S514, and S515, respectively. The response signal informs that channel switching to the additional VHF/UHF TV band is completed. Therefore, when the response signal is received from all the mobile stations 510, 520, 530, and 540 existing in the cell, the AP 500 resumes a wireless communication service using the additional VHF/UHF TV band.

The method of controlling the AP and the mobile station in the wireless communication system according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention there is provided a method and system that can improve a coverage and minimize a covered region of a wireless communication system.

Also, according to aspects of the present invention, there is provided a method and system that can improve the reliability of transmission of a control message in a wireless communication system.

Also, according to aspects of the present invention, there is provided a method and system that can improve a MAC transmission efficiency in a wireless communication system.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method of controlling an access point (AP) in a wireless communication system, the method comprising:
    determining whether a transmission of a control message is needed;
    transmitting the control message via a first frequency band in response to the transmission of the control message being needed;
    determining whether a transmission of a data message is needed;
    determining whether a second frequency band is available in response to the transmission of the data message being needed;
    transmitting the data message via the second frequency band in response to the second frequency band being available; and
    transmitting the data message via the first frequency band, previously used to transmit the control message, in response to the second frequency band being unavailable, wherein
    the first frequency band is lower than the second frequency band.

2. The method as claimed in claim 1, further comprising:
    switching to the first frequency band in response to the second frequency band being unavailable; and
    transmitting the data message within a contention section of the first frequency band where the control message is not transmitted.

3. The method as claimed in claim 1, wherein the transmitting of the control message further comprises:
    selecting a modulation and coding set (MCS) based on a channel state of the first frequency band.

4. The method as claimed in claim 1, further comprising:
performing a spectrum sensing operation for extracting an additional first frequency band.

5. The method as claimed in claim 4, further comprising:
determining whether an incumbent user for the first frequency band appears;
transmitting information about the extracted additional first frequency band to a mobile station via the second frequency band in response to the incumbent user appearing; and
receiving a response signal from the mobile station via the extracted additional first frequency band.

6. The method as claimed in claim 1, wherein the first frequency band includes a very high frequency (VHF) or ultra high frequency (UHF) television (TV) band, and
the second frequency band includes an industrial, scientific, and medical (ISM) band.

7. A method of transmitting a signal of an access point (AP) in a wireless communication system capable of using at least two frequency bands, the method comprising:
transmitting a control message via a first frequency band; and
transmitting a data message via a second frequency band after transmitting the control message in response to the second frequency band being available, wherein
the data message is transmitted via the first frequency band, previously used to transmit the control message, in response to the second frequency band being unavailable, and
the first frequency band is a lower frequency band than the second frequency band.

8. A method of controlling a mobile station in a wireless communication system, the method comprising:
determining whether a transmission of a control message is needed;
transmitting the control message via a very high frequency (VHF) or ultra high frequency (UHF) television (TV) band in response to the transmission of the control message being needed;
determining whether a transmission of a data message is needed;
transmitting the data message via an industrial, scientific, and medical (ISM) band in response to the transmission of the data message being needed and the ISM band being available;
determining whether an incumbent user for the VHF or UHF TV band appears;
switching to the ISM band in response to the incumbent user appearing;
receiving information about an additional VHF or UHF TV band from an access point (AP) via the ISM band; and
transmitting a response signal to the AP via the additional VHF or UHF TV band, wherein
the data message is transmitted via the VHF or UHF TV band in response to the ISM band being unavailable, and
the VHF or UHF TV band is lower than the ISM band.

9. The method as claimed in claim 8, wherein the determining whether the incumbent user for the VHF or UHF TV band appears adopts at least one of a scheme of determining whether the incumbent user appears when a wireless communication fails during a predetermined threshold time, and a scheme of sensing the incumbent user by using a periodical signal and thereby determining whether the incumbent user appears.

10. A computer-readable recording medium storing a program for implementing a method of controlling an access point (AP) in a wireless communication system, the method comprising:
determining whether a transmission of a control message is needed;
transmitting the control message via a first frequency band in response to the transmission of the control message being needed;
determining whether a transmission of a data message is needed; and
transmitting the data message via a second frequency band in response to the transmission of the data message being needed and the second frequency band being available, wherein
the data message is transmitted via the first frequency band, previously used to transmit the control message, in response to the second frequency band being unavailable, and
the first frequency band is lower than the second frequency band.

11. An access point (AP) of a wireless communication system, comprising:
a first determination unit configured to determine whether a transmission of a control message is needed;
a first transmitter configured to transmit the control message via a first frequency band in response to the transmission of the control message being needed;
a second determination unit configured to determine whether a transmission of a data message is needed; and
a second transmitter configured to transmit the data message via a second frequency band in response to the transmission of the data message being needed and the second frequency band being available, wherein
the data message is transmitted via the first frequency band, previously used to transmit the control message, in response to the second frequency band being unavailable, and
the first frequency band is lower than the second frequency band.

12. The AP as claimed in claim 11, further comprising:
a sensing unit to perform a spectrum sensing operation for extracting an additional first frequency band.

13. The AP as claimed in claim 12, further comprising:
a third determination unit to determine whether an incumbent user for the first frequency band appears;
a third transmitter to transmit information about the extracted additional first frequency band to a mobile station via the second frequency band in response to the incumbent user appearing; and
a receiver to receive a response signal from the mobile station via the extracted additional first frequency band.

14. The AP as claimed in claim 11, wherein the first frequency band includes a very high frequency (VHF) or ultra high frequency (UHF) television (TV) band, and
the second frequency band includes an industrial, scientific, and medical (ISM) band.

15. The AP as claimed in claim 11, wherein the control message includes at least one of a beacon message, a request to send (RTS) message, and a clear to send (CTS) message, and
the data message includes at least one of data and an acknowledgement (ACK) message.

16. A mobile station of a wireless communication system, comprising:
a first determination unit configured to determine whether a transmission of a control message is needed;

a first transmitter configured to transmit the control message via either a very high frequency (VHF) or ultra high frequency (UHF) television (TV) band in response to the transmission of the control message being needed;

a second determination unit configured to determine whether a transmission of a data message is needed;

a second transmitter configured to transmit the data message via an industrial, scientific, and medical (ISM) band in response to the transmission of the data message being needed and the ISM band being available;

a third determination unit configured to determine whether an incumbent user for the VHF or UHF TV band appears;

a switching unit configured to switch to the ISM band in response to the incumbent user appearing;

a receiver configured to receive information about an additional VHF or UHF TV band from an access point (AP) via the ISM band; and a third transmitter configured to transmit a response signal to the AP via the additional VHF or UHF TV band, wherein the data message is transmitted via the VHF or UHF TV band in response to the ISM band being unavailable, and the VHF or UHF TV band is lower than the ISM band.

17. The mobile station as claimed in claim 16, wherein the third determination unit adopts at least one of a scheme of determining whether the incumbent user appears in response to a wireless communication failing during a predetermined threshold time, and a scheme of sensing the incumbent user by using a periodical signal and thereby determining whether the incumbent user appears.

18. The mobile station as claimed in claim 17, wherein the control message includes at least one of a beacon message, an RTS message, and a CTS message, and the data message includes at least one of data and an acknowledgement message.

19. The mobile station as claimed in claim 18, wherein the predetermined threshold time is a period of the beacon message.

20. A method of controlling an access point (AP) in a wireless communication system, the method comprising:

providing at least two frequency bands;

determining whether a control message and data message are needed;

transmitting the control message on a frequency band of the at least two frequency bands that is separate from another frequency band of the at least two frequency bands that is used to transmit the data message in response to the another frequency band being available, and transmitting the data message on the frequency band in response to the another frequency band being unavailable, wherein the another frequency band is lower than the frequency band.

* * * * *